3,541,103
2-(4-BENZYLPIPERIDINO)ETHYLGUANIDINES
Maurice Claude Ernest Carron and Claude Louis Clement Carron, Chatenay-Malabry, Alexandra Francine Jullien, born Jandot, Paris, Bernard Philippe Bucher, Palaiseau, and Guy Charles Francois Georges Vandergucht, Paris, France, assignors to Societe Anonyme des Laboratoires Robert et Carriere, Paris, France, a company of France
No Drawing. Filed Jan. 2, 1968, Ser. No. 694,866
Claims priority, application France, Jan. 6, 1967, 90,187
Int. Cl. C07d 29/28
U.S. Cl. 260—293     3 Claims

ABSTRACT OF THE DISCLOSURE 2-(4-benzyl-1-piperidyl)ethylguanidine and its pharmaceutically acceptable acid addition salts are useful as hypotensive agents.

The present invention provides the new compound, 2-(4-benzyl-1-piperidyl)ethylguanidine [or 4-benzyl 1-(2-guanidinoethyl)piperidine], whose formula is:

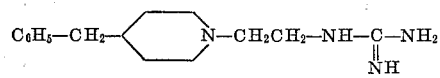

and its pharmaceutically acceptable acid addition salts, e.g. the dihydrochloride, sulphate, nitrate, tartrate, citrate, succinate or ascorbate.

This new compound is prepared, in accordance with the invention, by condensing (a) S-methylisothiourea or an acid addition salt thereof, O-methylisourea or an acid addition salt thereof, 3,5-dimethyl-1-guanyl-pyrazole or an acid addition salt thereof, cyanamide, dicyandiamide, or calcium cyanamide, with (b) 2-(4-benzyl-1-piperidyl)-ethylamine or an acid addition salt thereof. More particularly S-methylisothiourea sulphate, O-methylisourea chloride, or 3,5-dimethyl-1-guanyl-pyrazole nitrate may be condensed with 2-(4-benzyl-1-piperidyl)ethylamine to give the sulphate, dihydrochloride or nitrate respectively of the desired product. Alternatively, cyanamide, dicyandiamide, or calcium cyanamide may be condensed with 2-(4-benzyl-1-piperidyl)ethylamine hydrochloride to give the dihydrochloride of the desired product.

The following examples describe the preparation of the new compound.

EXAMPLE I 5.2 g. of sodium carbonate (0.049 mol) and 7.4 g. of chloracetonitrile (0.098 mol) in 60 ml. of benzene are introduced into a three-necked flask equipped with a mechanical stirrer, a reflux condenser and a Dean and Stark trap. A solution of 17.2 g. of 4-benzyl-piperidine (0.098 mol) dissolved in 30 ml. of benzene is added thereto all at once. The temperature rises. The mixture is heated under reflux with stirring for 9 hours and then cooled. The precipitated sodium chloride is filtered off. The filtrate is evaporated. The residue (25 g.) is recrystallised from 30 ml. of 75% strength ethyl alcohol. 12 g. of (4-benzyl-1-piperidyl)acetonitrile, M.P. 68° C. are obtained. A further 4 g. may be recovered from the mother liquors, making a total yield of 16 g., i.e. 75% of the theoretical.

4.16 g. of finely powdered lithium aluminum hydride (0.1 mol) and 330 ml. of anhydrous diethyl ether are introduced into a 3-necked flask fitted with a mechanical stirrer, a thermometer, and a dropping funnel. A solution of 14 g. of the above-described nitrile in 100 ml. of anhydrous diethyl ether is added dropwise while the temperature is kept at about +2° C. by means of a bath of ice and salt. The mixture is allowed to return to ordinary temperature and boiled for 10 minutes. After cooling to +10° C., 10 ml. of water are added dropwise to destroy the excess hydride and to decompose the complex. The precipitated hydroxide is filtered off and washed with diethyl ether. The filtered and the washing liquid are dried over anhydrous sodium sulphate and then evaporated under reduced pressure. When the ether has been driven off, the oily residue (12 g.) is twice distilled under greatly reduced pressure. 2-(4-benzyl-1-piperidyl)ethylamine passes over at between 121° and 130° C./0.04 mm. Hg. 8.5 g. (60% yield) of amine sufficiently pure for the next step are obtained in all.

6.3 g. of this amine (0.029 mol) and 4.2 g. of S-methylisothiourea sulphate in 8 ml. of water are heated under reflux. After 1½ hour the reaction is practically complete as shown by determination of the methylmercaptan evolved and absorbed in sodium hydroxide solution. On cooling, the sulphate of 2-(4-benzyl-1-piperidyl)-ethylguanidine precipitates. 15 ml. of 4 N sodium hydroxide solution (4 mols of NaOH per mol of sulphate) and 100 ml. of water are then added and the mixture extracted with 200 ml. of chloroform. The chloroform solution is dried over anhydrous sodium sulphate and filtered, and a stream of dry hydrogen chloride is passed into the filtrate. On evaporating the solvent under reduced pressure, an oily residue remains which changes into a viscous mass. The latter is dissolved in 35 ml. of ethyl alcohol and, on adding 70 ml. of diethyl ether, 2-(4-benzyl-1-piperidyl)-ethylguanidine dihydrochloride, M.P. about 165° C., which is hygroscopic, precipitates. 7 g. (74%) of the dihydrochloride are obtained.

The solubility of this salt in water is greater than 20% at 20° C.

EXAMPLE II 10 g. of 3,5-dimethyl-1-guanyl-pyrazole nitrate (0.05 mol) is dissolved in the minimum quantity (200 ml.) of ethanol and 21.8 g. of 2-(4-benzyl-1-piperidyl) ethylamine (0.1 mol) is added. The mixture is heated under reflux with agitation for 4 hours, and cooled, and the solvent is evaporated under reduced pressure. The residue is extracted twice with diethyl ether (50 mol each time) under reflux. The ether extracts 4 g. of 3,5-dimethyl pyrazole and 9 g. (40%) of unreacted piperidine starting material. The 2-(4-benzyl-1-piperidyl)ethylguanidine nitrate, which is insoluble in diethyl ether, is taken up in a little water, and the solution is made alkaline with 2 N sodium hydroxide solution. The base is salted out with sodium chloride and then converted into the dihydrochloride, (M.P. about 165° C.) as in Example I. The yield is 12.6 g., or 75% of theory, based on recovered starting material.

EXAMPLE III

A solution of 21.8 g. of 2-(4-benzyl-1-piperidyl)ethylamine (0.1 mol) in a little methanol is mixed with an aqueous solution of 11 g. of O-methylisourea hydrochloride (0.1 mol, Berichte 33, 1517 (1900), and the mixture is allowed to stand for several days. The solvent is then evaporated, the residue is taken up in a little ethanol, and ethanolic hydrogen chloride is added to the solution obtained. The dihydrochloride of 2-(4-menzyl-1-piperidyl))ethylguanidine (27 g., 82%, M.P. about 165° C.) is precipitated by the addition of diethyl ether.

EXAMPLE IV

To a solution of 21.8 g. of 2-(4-benzyl-1-piperidyl)-ethylamine (0.1 mol) in ethanol, sufficient ethanolic hydrogen chloride is added to bring the pH to 4. 4.2 g. of syanamide (0.1 mol) are then added and the mixture refluxed for 6 hours. After cooling, the solvent is evaporated under reduced pressure, and the residue is recrystallised from a mixture of ethanol and diethyl ether. 21.4 g.

(65%) of 2-(4-benzyl-1-piperidyl)ethylguanidine dihydrochloride, M.P. about 165° C., are obtained.

In the same manner, 2-(4-benzyl-1-piperidyl)ethylamine hydrochloride may be reacted with dicyandiamide or calcium cyanamide, and the same dihydrochloride, M.P. about 165° C., obtained.

The new compound as its dihydrochloride was examined pharmacologically. In the following, the compound is referred to by the abbreviation BPEG.

Toxicity

Experiments were carried out with mice of both sexes, of the Swiss strain, and of weights between 18 and 22 g. The 50% lethal doses were determined according to the method of Miller and Tainter (Proc. Soc. Exp. Biol. Med. 1944, 57, 261). The following results were found:

| | Mg./kg. |
|---|---|
| $LD_{50}$, administered orally | 1500 |
| $LD_{50}$, administered intraveneously | 7.5 |

(2) Effects on the vardiovascular system (a) *Effect on the arterial pressure.*—The effect of BPEG was investigated in anaesthetised rats and dogs. After releasing the carotid, a cannula was introduced into it and the pressure recorded by means of the Condon manometer (Brit. J. Pharmacol. 1961, 6, 19). The effect of the compound on the initial pressure and on the response to various stimuli (in particular adrenalin and acetylcholine) was studied.

In the case of rats, in intraveneous doses of 2 and 5 mg./kg., BPEG caused a clear hypotension of long duration (greater than 30 minutes) without a return to the initial pressure. At a dose of 5 mg./kg. and adrenolytic effect (5 γ/kg. of adrenalin) was observed.

In the case of dogs, the hypotensive effect was considerable for intraveneous doses of 2 mg./kg. onwards (50% reduction of the starting pressure) but it was of short duration. Hypotension was greater still and more prolonged for an intraveneous dose of 5 mg./kg. A clear change in the respiration was not observed. The effect of adrenalin (5γ/kg.) was slightly reduced, as was that of histamine (10γ/kg.). The effect of acetylcholine (15γ/kg.) was unchanged.

(b) *Effect on the peripheral vessels.*—The peripheral vasodilator effect was studied on the paw of a dog perfused in situ, by the method of Binet and Burstein (C.R. Acad. Sciences, 1945, 221, 197). By simultaneously recording the general carotid pressure and the pressure above a femoral artery withdrawn from general circulation by the attached heart system (Jouvelet pump), this method makes it possible to separate the peripheral vasomotor effect of the compound injected directly into the perfused vessels from the vasomotor effect of central or cardiac origin. Thus, vasodilation of strictly peripheral origin shows itself by a reduction in pressure in the isolated perfused vessels only. In these experiments, the reference compound was isoxsuprine or 2-(1-methyl-2-phenoxyethylamino)-1-(4-hydroxyphenyl)propan-1-ol. BPEG at an intraveneous dose of 500γ exerted a weak peripheral vasodilatory effect comparable to the effect produced by an intravenous dose of 5γ of isoxsuprine.

(3) Sympatholytic effects (a) *Effect on peri-arterial sympathetic stimulation of the rabbit ileum.*—The stimulation of the sympathetic nerves which accompany a mesenteric artery causes an inhibition of the pendular movements of a fragment of rabbit ileum kept alive in an isolated organ dish containing Tyrode's liquid. The addition of an adrenergic neuron blocking agent (that is to say a substance which prevents acetylcholine from liberating the adrenergic mediators contained in the end plates located between the sympathetic terminals and the muscular fibres) to the bath causes the ileum to react only to the direct effect of the acetyl-choline liberated from the sympathetic nerve fibres. This motor reaction annuls the inhibiting effect caused by the liberation of noradrenaline [Finkelman method (J. Physiol., London, 1930, 70, 145), modified by Day and Rand (Brit. J. Pharmacol. 1961, 17, 245)]. In this experiment, the reference product was guanethidine or (1-octahydro-azocinyl)-2-ethyl-guanidine sulphate. 0.5 γ/ml. in the organ bath of BPEG produced an effect similar to that of 1 γ/ml. of guanethidine.

(b) *Effect on the cardiovascular reactions to sympathetic peripheral stimulation in the dog.*

(I) Inhibition of the vasoconstrictor reflex caused by occlusion of the carotids (method of Maxwell et al., J. Pharmacol. exp. Ther. 1960, 128, 22).

BPEG administered to a dog (anaesthetised by intravenous administration of 120 mg./kg. of chloralose as a 1% solution in physiological saline) in a single intraveneous dose of 2 mg./kg. inhibited the hypertensive reflex resulting from repeated occlusion of the carotids (for 15 seconds) for a period of more than 120 minutes. The guanethidine reference compound under the same conditions caused a comparable inhibition at a dose of 15 mg./kg. administered in 2 stages.

(II) Inhibition of the vasoconstrictor reflex caused by stimulation of the central end of the pneumogastric nerve. (Technique of Boura and Green, Brit. J. Pharmacol. 1959, 14, 536.)

BPEG administered to a dog (anaesthetised by intraveneous administration of 120 mg./kg. of chloralose as a 1% solution in physiological saline) at an intraveneous dose of 2 mg./kg. inhibited the hypertensive reflex resulting from the stimulation of the central end of the pneumogastric nerve (50 c.p.s., 30 volts, 0.5 milliseconds every 10 seconds.)

(III) Inhibition of the cardiac effects resulting from the peripheral excitation of the stellar ganglion. (Method of Klepping and Colleagues, Therapie 1965, 20, 205.)

The stellar ganglion was isolated in the conventional manner, stimulating electrodes were fixed in position, and the effects of stimulation on the arterial pressure, the electrocardiogram and the cardiac frequency were then recorded with a Schwarzer polyphysiograph. At an intraveneous dose of 2 mg./kg. given to a dog, treated with chloralose, suppression of the secondary tachycardia caused by stimulation of the steelar ganglion was observed.

(IV) Reinforcement of the blood-press effects of noradrenaline. (Technique of Stafford, Brit. J. Pharmacol. 1963, 21, 361.)

BPEG given at an intraveneous dose of 2 mg./kg. to a dog treated with chloralose increased the hypertensive peak of noradrenaline by 50%. Guanethidine, the reference compound, exerted the same effect at a dose of 15 mg./kg. injected intraveneously in 2 stages.

(c) *Effect on hypertension caused by dexamphetamine tartrate or D-phenyl-isopropylamine (technique of Maxwell, loc. cit.).*—An intraveneous injection of 500 γ/kg. of dexamphetamine into a dog treated with chloralose caused a hypertension which was blocked and reversed by intraveneous administration of 2 mg./kg. of BPEG or of 15 mg./kg. of guanethidine injected intraveneously in 2 stages.

(4) Effect on the parasympathetic system

In order to determine whether the parasympathetic transmission was blocked at the same time as the sympathetic transmission, the effect of BPEG, compared to guanethidine, on the cardiac inhibiting effects of peripheral stimulation of the vagus was studied. (Method of Maxwell, loc. cit.). BPEG, administered at an intraveneous dose of 2 mg./kg. to dogs treated with chloralose only produced a transient reduction of the hypotensive phase and of the hypotension amplitude. Guanethidine however block the parasympathetic system. It can be concluded that BPEG possesses an almost pure sympatholytic effect.

(5) Other effects (a) Antihistamine effect.—When tested on the ileum of a guinea pig, isolated in a 5 ml. organ bath, by the conventional Magnus method, it was found that BPEG, at a dose of 1 γ per bath, reinforced the effect of 0.1 γ of histamine. Guanethidine caused a similar effect at a dose of 10 γ per bath.

(b) Anti-inflammatory effect.—In experimental carrageenin-induced oedema of the posterior paw of a rat (technique of Arrigoni-Martelli and Conti, Med. exp. 1964, 10, 164) BPEG, orally administered at a dose of 200 mg./kg., exerted an anti-inflammatory effect which was however less than that of 100 mg./kg. of phenylbutazone. A similar effect on oedema caused by kaolin was observed.

The results of the pharmacological studies described show that BPEG can be used therapeutically in human medicine, especially as a hypotensive agent in hypertensions of various causes. The invention accordingly includes within its scope pharmaceutical compositions comprising 2-(4-benzyl-1-piperidyl)ethylguanidine or a pharmaceutically acceptable acid addition salt thereof in association with a pharmaceutical diluent.

The compound may be administered orally, rectally, or intramuscularly, the optimum daily dose being 5 to 50 mg. administered orally or rectally, or 1 to 10 mg. administered parenterally.

Examples of pharmaceutical forms are given below:

FORMULA 1—TABLETS

|  | G. |
|---|---|
| 2-(4-benzyl-1-piperidyl)-ethylguanidine | 0.010 |
| Rice starch | 0.035 |
| Talc | 0.053 |
| Magnesium stearate | 0.001 |

The dose of active compound may vary from 0.005 to 0.015 g. Any conventional excipient for tablets may be used. The tablets may be converted into dragees or coated.

FORMULA 2—SUPPOSITORIES

BPEG: 0.010 g.
Usual excipient for suppositories (for example Imhausen excipient, cacao butter or carbowax): Q.s. for 1 suppository.

The dose of BPEG may range from 0.005 to 0.015 g.

FORMULA 3—INJECTABLE SOLUTION 1 or 2 ml. ampoules containing 2 mg./ml. of BPEG in a sterile psysiological solution.

We claim:

1. 2-(4-benzyl-1-piperidyl)ethylguanidine and its pharmaceutically acceptable acid addition salts.
2. 2-(4-benzyl-1-piperidyl)ethylguanidine.
3. 2-(4-benzyl-1-piperidyl)ethylguanidine sulphate or dihydrochloride.

References Cited

UNITED STATES PATENTS

| 3,055,883 | 9/1962 | Mull | 260—239 |
| 3,252,982 | 5/1966 | Mizzoni et al. | 260—293 |
| 3,252,983 | 5/1966 | Mizzoni et al. | 260—293 |
| 3,317,545 | 5/1967 | Albrecht et al. | 260—293 |
| 3,364,220 | 1/1968 | Biel et al. | 260—293 |

OTHER REFERENCES

Mull et al., J. Med. Chem. 5, 944–9 (1962).

HENRY R. JILES, Primary Examiner

G. T. TODD, Assistant Examiner

U.S. Cl. X.R.

424—267